Figure 1:
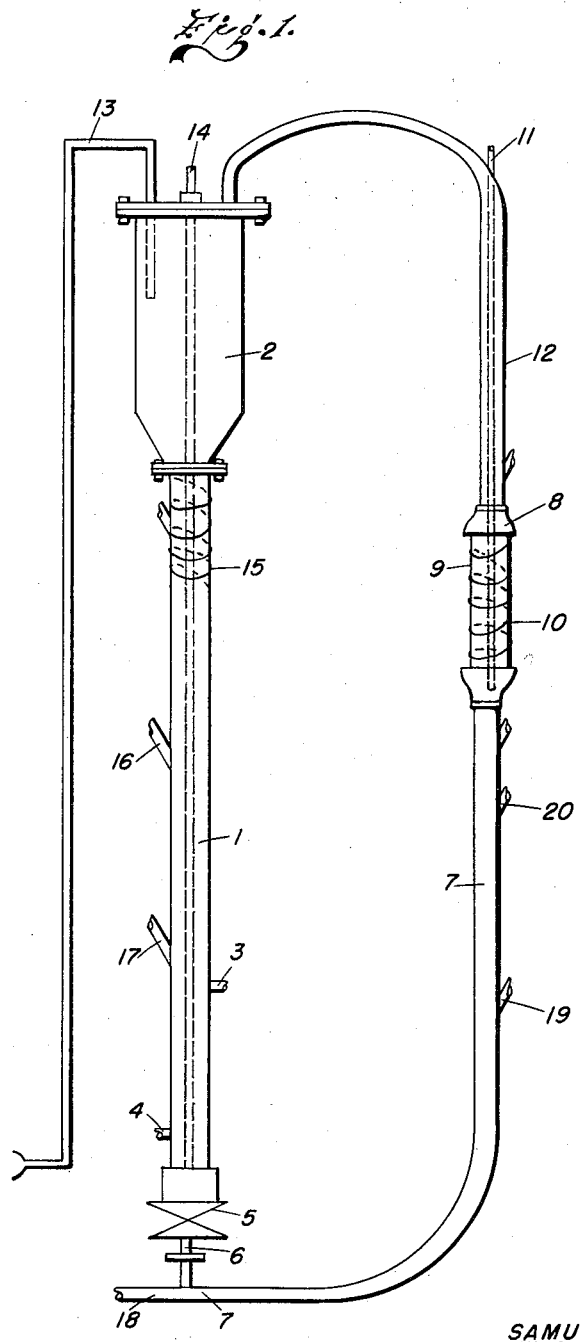

Dec. 9, 1958   S. W. TRIBIT ET AL   2,863,884
PRODUCTION OF 1,4-NAPHTHOQUINONE WITH VANADIUM
CATALYSTS OF CONTROLLED VALENCE
Filed March 7, 1956

INVENTORS.
SAMUEL W. TRIBIT
WESLEY O. FUGATE
JAMES K. DIXON
BY
Wm. P. Spielman
ATTORNEY.

United States Patent Office 2,863,884
Patented Dec. 9, 1958

2,863,884

PRODUCTION OF 1,4-NAPHTHOQUINONE WITH VANADIUM CATALYSTS OF CONTROLLED VALENCE

Samuel W. Tribit, Hawthorne, N. Y., and Wesley O. Fugate, Old Greenwich, and James Kenneth Dixon, Riverside, Conn., assignors to American Cyanamid Company, New York, N. Y., a corporation of Maine Application March 7, 1956, Serial No. 569,991

4 Claims. (Cl. 260—396)

This invention relates to a method for the production of alphanaphthoquinone or 1,4-naphthoquinone by the vapor phase catalytic oxidation of naphthalene in a bed of fluidized vanadium catalyst. The principal object of the invention is to obtain good yields of the naphthoquinone by maintaining a high $V_2O_4$:$V_2O_5$ ratio in the vanadium-containing contact mass.

In our copending application Serial No. 377,248, filed August 28, 1953, now U. S. Patent No. 2,765,323, issued October 2, 1956, of which this is a continuation-in-part, the production of naphthoquinone by the vapor phase partial oxidation of naphthalene over a fluid bed catalyst is described and it is shown that good yields of the desired product are obtained by operating at catalyst temperatures within the range of about 250° C. to 425° C. and preferably at about 300°–400° C. At these temperatures and with naphthalene to air ratios of about 0.5 to 2 mol percent of naphthalene, converter products having a naphthoquinone to phthalic anhydride ratio of from 1:1 to about 1:20 are obtained.

The present invention is directed particularly to improvements in the process of the above-described application obtained by operating with fluidized catalytic materials or contact masses containing as the principal active catalyst a mixture of vanadium tetroxide and vanadium pentoxide having a high $V_2O_4$:$V_2O_5$ ratio. We have found that good yields of naphthoquinone, corresponding to a naphthoquinone-to-phthalic anhydride ratio of at least 1:15 in the converter products, can be obtained by maintaining the vanadium catalyst in a highly reduced condition wherein from about 75% to about 95% of the vanadium is present as $V_2O_4$, the remainder being present as $V_2O_5$. This $V_2O_4$:$V_2O_5$ ratio is preferably maintained throughout the entire course of the naphthalene oxidation by continuously oxidizing part of the catalyst with hot air as described in the above application.

The practical advantages obtained by oxidizing naphthalene-oxygen mixtures of the type hereinafter described in the presence of a highly reduced $V_2O_4$:$V_2O_5$ catalyst mixture will be demonstrated in the following examples, and therefore do not require extensive discussion. Although the invention is not limited by any theory of operation, we believe that the improved results are due, at least in part, to a substantial decrease in the oxidation of naphthoquinone to phthalic anhydride resulting from the relatively small proportion of pentavalent vanadium in the catalyst. It is known that phthalic anhydride is produced directly by the vapor phase catalytic air oxidation of naphthalene, and our above-entitled application also shows that under suitable operating conditions naphthalene can be oxidized to 1,4-naphthoquinone. There is however, a third reaction that apparently takes place under the same operating conditions in the presence of vanadium pentoxide catalysts; this is the vapor phase oxidation of naphthoquinone to phthalic anhydride. By carrying out the oxidation of naphthalene in the presence of a catalyst mixture wherein the principal active catalyst is a $V_2O_4$—$V_2O_5$ mixture containing more than 75% of $V_2O_4$ the rate of further oxidation of the naphthoquinone to phthalic anhydride is substantially reduced, and greater yields of naphthoquinone are therefore obtained.

The invention will be further described with reference to the accompanying drawing, wherein the single figure depicts a pilot plant-scale converter equipped with an external catalyst recirculating line and regenerator for maintaining a desired degree of oxidation in the catalyst.

Referring to Fig. 1, the reactor designated by reference numeral 1 consists of a ¾" x 62" stainless steel tube connected to a 3" x 36" stainless steel catalyst disengaging section 2. An inlet pipe 3 for the introduction of a preheated mixture of naphthalene and air is provided in the reaction tube 1 at the point shown, and the two-foot section between this inlet and an air inlet 4 functions as a standpipe to give additional static pressure to the reactor side of the system. Below the standpipe is a motor-driven slide valve 5 to control the rate at which catalyst is withdrawn from the system for reoxidation, and this valve communicates through a short connection 6 with a transport line 7 leading to a regenerator 8. The capacity of this regenerator is small with respect to that of the reactor 1, since the rate and extent of catalyst reoxidation is only that corresponding to its rate of reduction in the reactor; in the apparatus shown it consists of a 1¼" x 11" stainless steel tube 9 wound with a nichrome spiral seating element 10 for maintaining regeneration temperatures about the same as those in the reactor and containing a thermocouple well 11. From the top of the regenerator a return line 12 connects with the disengaging section 2 so that the catalyst after partial oxidation can be returned continuously to the reactor. The disengaging section contains a fiber glass bag filter (not shown) which surrounds an outlet line 13 leading to a condenser for the phthalic anhydride product. The reactor 1 is equipped with a suitable thermocouple well 14 and with a winding of nichrome spiral wire 15 for maintaining temperatures of about 250°–400° C. in the reactor. It will be understood that in commercial sized units cooling elements would be used in the reactor to remove the heat given off by the naphthalene oxidation, but in pilot plant equipment it is usually necessary to supply heat to maintain the desired temperature in the catalyst bed.

In operation a finely divided catalyst is filled into the reactor through valved inlet pipes 16 and 17 and metered air, preheated to the desired temperature, is passed into the transport line 4. A mixture of air and naphthalene vapor is introduced into this catalyst through line 3 and the gaseous reaction products are withdrawn through line 13. The air transported catalyst which drops through the valve 5 is picked up by a stream of preheated air introduced through line 18 and carried through line 7 into the regeneration section where, because of its increased cross-sectional area, the linear velocity is decreased and a dense-phase fluid bed is formed. The catalyst leaves the regenerator through line 12 and passes into the disengaging section 2 from which it drops into the reactor section while the air passes through the bag filter and leaves the apparatus through line 13.

The vertical selection of the transport line 7 contains two ⅛" manometer taps 19 and 20 which are 31¼" apart. A differential manometer, with platinum electrodes in each leg, is placed across these taps. Two electronic relays are connected by the manometer taps and the motor-driven slide valve 5 so that an increase or decrease in the pressure across the taps causes the valve to be opened or closed, thus increasing or decreasing the catalyst circulation rate. Pressure taps in the reactor and regenerator sections permit determination of catalyst bed height and catalyst density.

In operating on a commercial scale continuous regeneration can be carried out very effectively by introducing air and naphthalene vapors into different parts of the fluidized catalyst bed. Thus hot air or a portion of the hot air may be introduced in the bottom of the converter and naphthalene vapors introduced at some higher point in the catalyst bed. The hot air and the reoxidized reduced catalyst are in the bottom of the bed and as the bed is in constant turbulence the catalyst reduced by high naphthalene loadings or lower temperatures in the upper part of the bed, gradually passes down to the regenerating zone.

Representative experiments carried out in the equipment shown on the drawing have demonstrated that naphthoquinone-phthalic anhydride mixtures containing at least one part by weight of naphthoquinone for each 15 parts of phthalic anhydride can be obtained with naphthalene-oxygen ratios within the range of about 5-20 mol percent, which correspond to loadings of about 1-4 mol percent of naphthalene when the oxidizing gas is air. However, the process of the invention is not dependent on the use of air as the oxidizing gas; in fact, the oxidation of naphthoquinone to phthalic anhydride can be still further reduced by operating with nitrogen-oxygen mixtures containing about 12-20% of oxygen. Such mixtures of reduced oxygen content cannot ordinarily be employed in vapor phase catalytic oxidations of hydrocarbons without correspondingly reducing the quantity of vaporized hydrocarbon in the gas mixture, as otherwise the catalyst would quickly become over-reduced. With continuous reoxidation of the catalyst, however, the employment of gas mixtures of reduced oxygen content is entirely feasible.

The process of our invention is not limited to the use of any particular class of vandium-containing catalyst, and any desired catalyst containing $V_2O_5$ or a $V_2O_4$—$V_2O_5$ mixture may be used. We prefer to use the catalyst compositions described in the copending application referred to above or in the U. S. patent of Fugate and Tribit, No. 2,698,330. The best operating results are obtained when catalysts are used wherein the vanadium oxides in amounts of about 5-25% on the weight of the composition are supported on a carrier, preferably one having a microporous structure such as a metal oxide gel catalyst of the type of silica gel, alumina gel, zeolites and the like. Optimum performance of catalysts containing such supports is obtained when the contact mass also contains a compound of an alkali metal such as potassium, sodium or lithium which is usually present in the form of a salt such as the phosphate, sulfate, pyrosulfate and the like. These alkali metal salts are believed to function as a flux for the vanadium pentoxide in the catalyst, increasing its degrees of penetration into the pores of the gel catalyst under operating conditions. The catalyst may also contain any known or approved promoter for the vanadium oxides present, oxides of silver, cerium, thorium and aluminum being preferred. Methods for the preparation of such catalysts are described in the Fugate et al. patent referred to above; a typical procedure is described in Example 1.

One of the most important advantages of our invention is found in the high naphthalene-to-oxygen ratios and the high catalyst loadings that can be used when continuous regeneration of the catalyst to a $V_2O_4$:$V_2O_5$ ratio of 75:25 and higher is employed. Loadings which would rapidly reduce the activity of the vanadium oxide catalyst can be used, since over-reduction and deterioration of catalyst activity are avoided by continuous reoxidation of a portion of the catalyst in a separate regenerating step and return of the reoxidized catalyst in the naphthalene oxidation process.

When air is used as the oxidizing gas the quantities of naphthalene vapor may be increased to as much as 4 mol percent of naphthalene without operating difficulties, and plant operations within the range of from 3 to 4 mol percent of naphthalene are entirely feasible, particularly when catalyst temperatures within the range of 300°–400° C. are used.

The term "mol percent of naphthalene" expresses in mols the percentage of naphthalene in a mixture of naphthalene and oxidizing gas. Thus a loading of one mol percent of naphthalene in air is a mixture of one mol or 128 grams of naphthalene with each 99 mols or 2850 grams of air and corresponds to a weight ratio of about 1 to 29.

The invention will be further described and illustrated in the following specific examples to which, however, it is not limited.

EXAMPLE 1

Comparative tests were made in the apparatus described above using a catalyst prepared as follows:

To 953 grams of 30° Bé. potassium silicate in 2600 mls. of deionized water there was added slowly and with stirring 57 grams of ammonium metavanadate followed by 920 grams of 17% sulfuric acid. The pH was then adjusted to 8.0 by means of ammonium hydroxide. The gel was heated to 75° C. and 7.1 grams of silver nitrate in 50 mls. of water was added. The solution was then concentrated by boiling to about one-half its original volume and the semi-solid mass was dried overnight on a steam bath. It was further dried at 125° C. for about 10 hours and then ignited at 450° C., cooled, ground and sieved to the following size:

|   | Percent |
| --- | --- |
| +100 mesh | 5–10 |
| −100+200 mesh | 30–40 |
| −200+325 mesh | 30–40 |
| −325 mesh | 20–25 |

The catalyst was filled into the converter in a fully oxidized condition to a bed height of five feet and a naphthalene-air mixture was passed through it at the temperatures shown in the following table. The inlet naphthalene concentration was 2.2 mol percent based on air, or 11 mol percent based on the oxygen; the linear gas velocity was 1 foot per second and the contact time of naphthalene vapor with the catalyst was from 4.3 to 4.5 seconds. The linear velocity of the air through the catalyst bed in the regenerator 10 was 1 foot per second and the regeneration temperature was the same as that of the catalyst in the reactor 1.

The results obtained at varying reaction temperatures and with varying $V_2O_4$:$V_2O_5$ ratios in the catalyst are shown in Table 1. At the beginning of each run the converter was operated with the naphthalene-air mixture until the catalyst attained the desired valence condition after which this condition was maintained by operation of the regenerator. No quantitative data were taken until at least four hours had elapsed to make sure that constant equilibrium conditions had been attained. A catalyst sample was then withdrawn from the reactor and the amount of reduced vanadium determined by analysis. In the headings of the table "PAA" means phthalic anhydride; "NQ" means 1,4-naphthoquinone; "Nap" means naphthalene; and "percent $V^4$" means the percent of tetravalent vanadium based on the weight of the catalyst. "Total V" is based on 5.2% vanadium in the catalyst.

Table 1

| Temp., °C. | Percent V⁴ | Percent Conversion to— | | | | | Yield, lbs./100 lbs. Nap | |
|---|---|---|---|---|---|---|---|---|
| | | Total V | PAA | NQ | CO₂ | Nap | PAA | NQ |
| 380 | 1.6 | 31 | 90 | 0 | 10.0 | 0 | 104 | 0 |
| 380 | 3.0 | 58 | 85 | 1.9 | 12.0 | 0 | 98 | 2.4 |
| 380 | 3.8 | 73 | 81 | 4.1 | 12.0 | 0 | 94 | 5.1 |
| 380 | 4.5 | 86 | 78 | 5.4 | 12.0 | 0 | 90.5 | 6.8 |
| 380 | 4.9 | 94 | 59 | 13.3 | 13.5 | 14 | 68 | 16.6 |
| 350 | 3.7 | 71 | 90 | 4.5 | 8.0 | 0 | 104 | 5.3 |
| 350 | 4.1 | 79 | 75 | 12.0 | 9.0 | 0 | 86.6 | 15.0 |
| 350 | 4.9 | 95 | 48 | 20.0 | 11.0 | 21 | 55.0 | 25.0 |
| 320 | 3.7 | 71 | 79 | 12.3 | 7.0 | 0 | 91.5 | 15.3 |
| 320 | 4.3 | 83 | 59 | 19.6 | 7.0 | 14 | 69.0 | 24.6 |
| 320 | 4.5 | 86 | 54 | 24.0 | 14 | 62.5 | 29.8 | |
| 320 | 5.0 | 96 | 19 | 9.7 | 7.5 | 63 | 22.7 | 12.0 |
| 300 | 4.1 | 80 | 62.8 | 25.6 | 4.0 | 7 | 72.5 | 31.8 |
| 300 | 4.5 | 86 | 51 | 27.5 | 5.4 | 16 | 59.0 | 34.0 |
| 300 | 4.7 | 90 | 47.2 | 25.9 | 5.9 | 21 | 54.0 | 32.2 |
| 300 | 4.9 | 95 | 19.6 | 12.1 | 7.4 | 61 | 22.6 | 15.4 |
| 275 | 4.1 | 80 | 64.4 | 23.2 | 5.8 | 5 | 74.1 | 29.0 |
| 275 | 4.5 | 86 | 47.2 | 28.2 | 5.1 | 19 | 58.9 | 35.2 |
| 275 | 4.8 | 92 | 9.7 | 3.8 | 1.0 | 18 | 10.2 | 4.8 |

The high naphthoquinone to phthalic anhydride ratios that result from a high V₂O₄:V₂O₅ ratio in the catalyst are shown by these figures. At 380° the yield of naphthoquinone increases from zero to about 17 pounds per 100 pounds of naphthalene feed when the reduced vanadium in the catalyst is increased from 30% to 95%, and this effect is maintained at lower temperatures. From a practical point of view optimum operating conditions should be such that the highest yields of naphthoquinone and a high ratio of naphthoquinone to phthalic anhydride are combined with a low content of unconverted naphthalene in the converter products and these are more nearly attained at temperatures between 275° C. and 350° C. than at higher temperatures. In the lower temperature range the naphaloquinone yield varies from about 15% to 35% and the naphthoquinone to phthalic anhydride ratio is as low as 1 to 1.6 when the content of reduced vanadium in the catalyst is between about 75% and 95%, and these ranges constitute the preferred operating conditions in practicing the invention on a commercial scale.

EXAMPLE 2

In order to obtain comparative results the converter was operated under the conditions described in Example 1 but with the valve 5 closed and no air in the regenerator. The maximum yields of naphthoquinone obtained at varying catalyst temperatures, regardless of catalyst valence, are shown in the first column of Table 2 and are compared with the optimum yield at the same temperature from Table 1. The results were as follows:

Table 2

| Temp., °C. | Yield, lbs. NQ per 100 lbs. Nap | |
|---|---|---|
| | No Catalyst Oxidation | From Table 1 |
| 380 | 1 | 17 |
| 350 | 9 | 25 |
| 320 | 19 | 30 |
| 300 | 15 | 34 |

EXAMPLE 3

Example 1 shows that excellent yields of napthoquinone are obtainable at catalyst loadings corresponding to a naphthalene:air ratio of 2.2 mol percent, which is considerably higher than those used in our copending application. However, the process of the present invention can be operated with even greater naphthalene throughputs as is shown by the following results obtained with the same catalyst and in the apparatus shown on the drawings.

The ratio of naphthalene to air in the gas mixture passed over the catalyst was 3.3%; the catalyst temperature was 350° C. and the ratio of catalyst in the reactor to that in the regenerator was 3:1. The regenerator temperatures were from 350° to 400° C.

| Percent V⁴ | Percent Conversion to— | | | | Yield, lbs./100 lbs. Nap | |
|---|---|---|---|---|---|---|
| Total V | PAA | NQ | CO₂ | Nap | PAA | NQ |
| 72 | 91 | 1 | 8 | 0 | 105 | 1.2 |
| 86 | 73 | 11 | 9 | 7 | 85 | 13.6 |
| 90 | 62 | 13 | 11 | 14 | 72 | 16 |
| 95 | 41 | 16 | 9 | 33 | 47 | 19.8 |

It is evident, therefore, that continuous catalyst regeneration will permit operation at much greater converter capacities than has heretofore been possible.

What we claim is:

1. A method of producing 1,4-naphthoquinone which comprises passing a mixture of naphthalene vapor and an oxygen-containing gas having a ratio of naphthalene to oxygen of about 5 to 20 mol percent through a bed of fluidized catalytic material containing a V₂O₄—V₂O₅ mixture as the principal active catalyst at reaction temperatures within the range of about 250°–400° C. and maintaining the ratio of V₂O₄ to V₂O₅ in the catalyst within the range of from about 75:25 to 95:5.

2. A method according to claim 1 wherein the oxygen-containing gas is air.

3. A method of producing 1,4-naphthoquinone which comprises passing a mixture of naphthalene vapor and an oxygen-containing gas having a ratio of naphthalene to oxygen of about 5 to 20 mol percent through a bed of fluidized catalytic material containing a V₂O₄—V₂O₅ mixture as the principal active catalyst at reaction temperatures within the range of about 250°–400° C. and maintaining the ratio of V₂O₄ to V₂O₅ in the catalyst within the range of from about 75:25 to 95:5 by continuously withdrawing catalyst from said bed, continuously partially oxidizing it to a V₂O₄ to V₂O₅ ratio within said range and returning it to said catalyst bed.

4. A method of producing 1,4-naphthoquinone which comprises passing a mixture of naphthalene vapor and an oxygen-containing gas having a ratio of naphthalene to oxygen of about 5 to 20 mol percent through a bed of fluidized catalytic material containing a V₂O₄—V₂O₅ mixture as the principal active catalyst at reaction temperatures within the range of about 275°–350° C. and maintaining the ratio of V₂O₄ to V₂O₅ in the catalyst within the range of from about 80:20 to 90:10 by continuously withdrawing catalyst from said bed, continuously partially oxidizing it to a V₂O₄ to V₂O₅ ratio within said range and returning it to said catalyst bed.

References Cited in the file of this patent

UNITED STATES PATENTS

| | | |
|---|---|---|
| 1,692,126 | Jaeger | Nov. 20, 1928 |
| 1,844,387 | Jaeger | Feb. 9, 1932 |
| 1,844,388 | Jaeger | Feb. 9, 1932 |
| 2,526,689 | Rollman | Oct. 24, 1950 |
| 2,698,330 | Fugate et al. | Dec. 28, 1954 |
| 2,765,323 | Dixon et al. | Oct. 2, 1956 |

FOREIGN PATENTS

| | | |
|---|---|---|
| 724,681 | Great Britain | Feb. 23, 1955 |

OTHER REFERENCES

Marek et al.: "Catalytic Oxidation of Organic Compounds in the Vapor Phase" (ACS Monograph), 1932, J. Little and Co., see page 418.

Chemical Abstracts, vol. 48, p. 12,715 (1954), abstract of Suvorov et al. Izvest. Akad. Nauk Kazakh SSR. No. 118, Ser. Kim. No. 6, 82–9 (1953).